Dec. 8, 1936.  E. G. LANZI ET AL  2,063,446
ROASTING MACHINE
Filed April 12, 1934   5 Sheets-Sheet 2
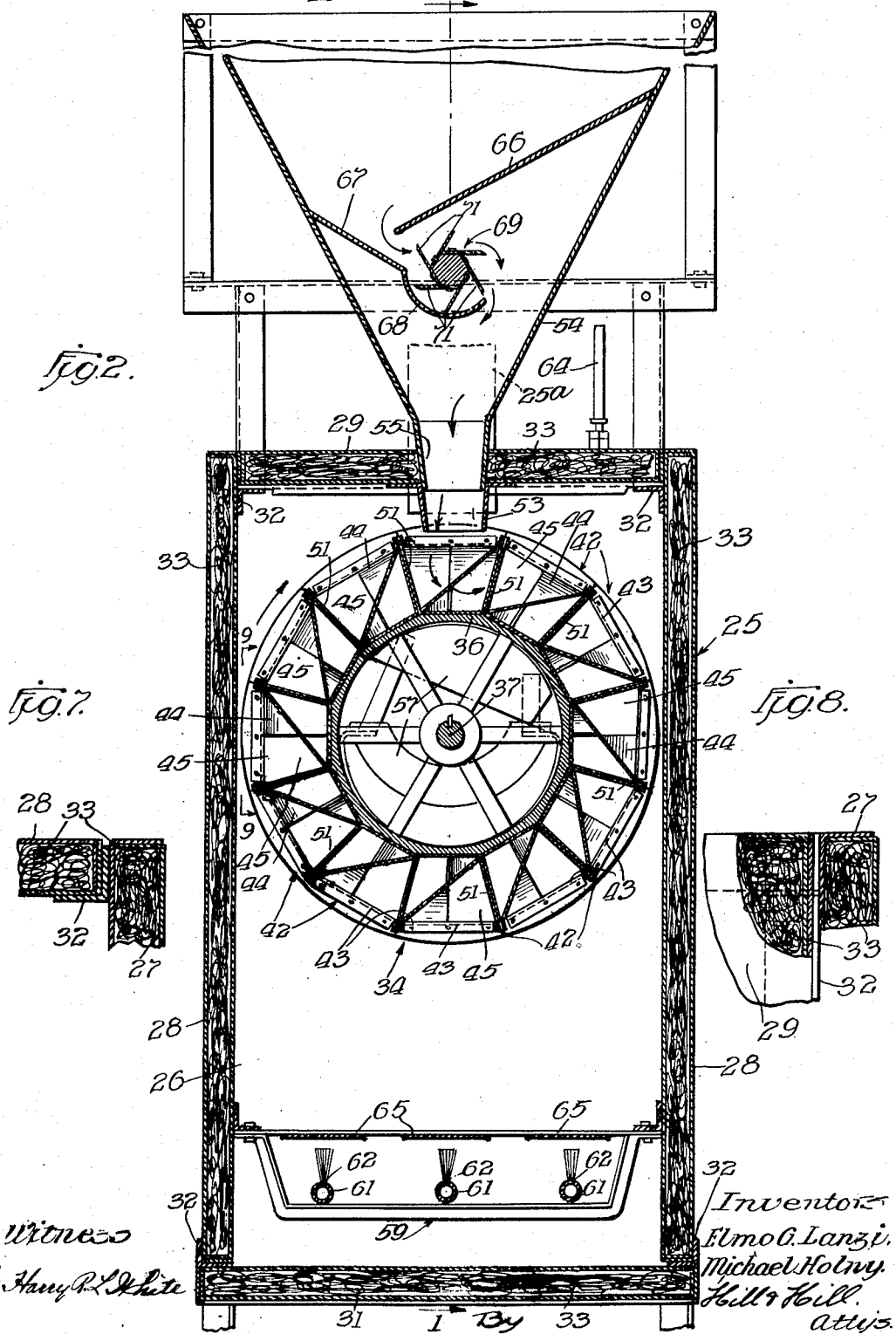
Inventors
Elmo G. Lanzi,
Michael Holny.
Hill & Hill
attys.

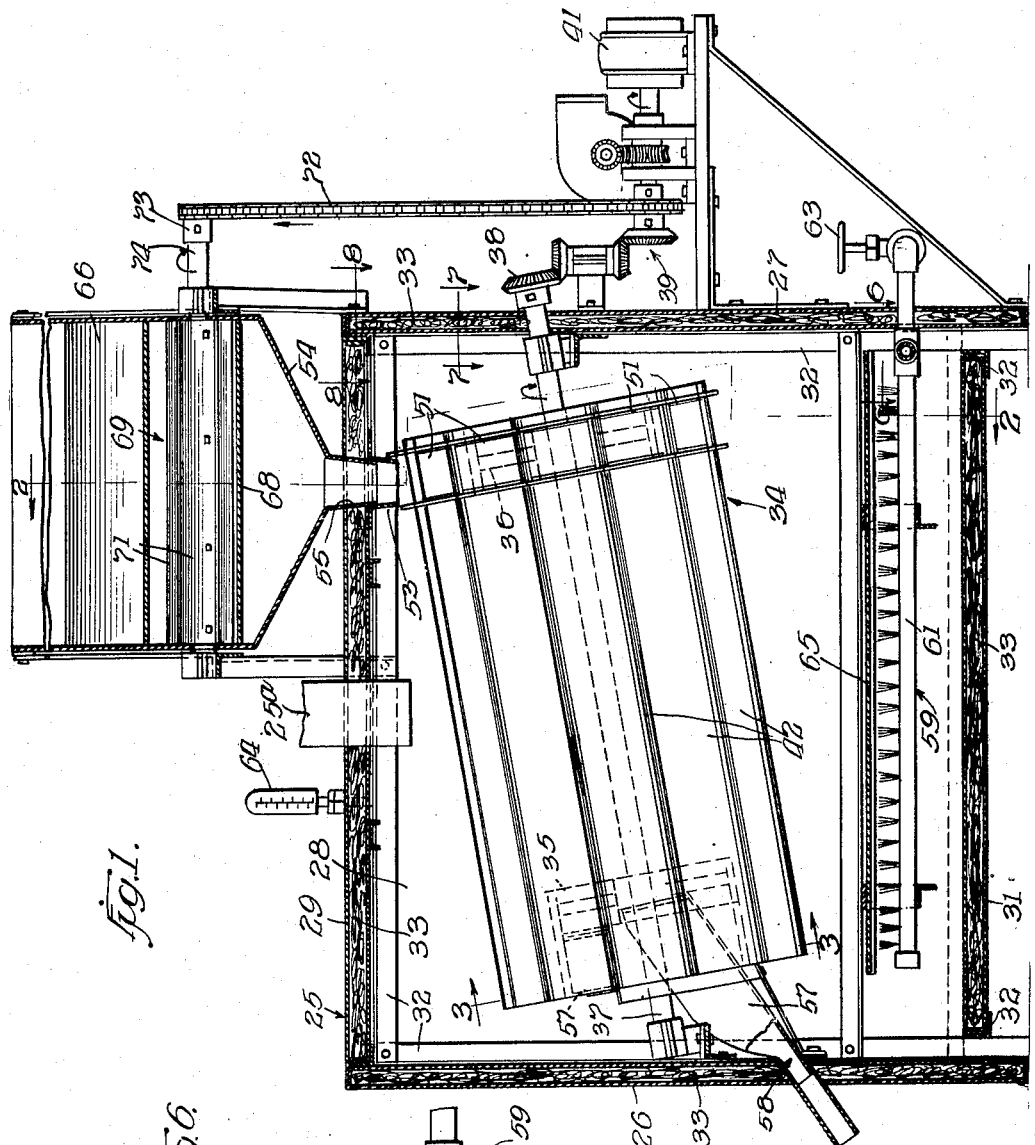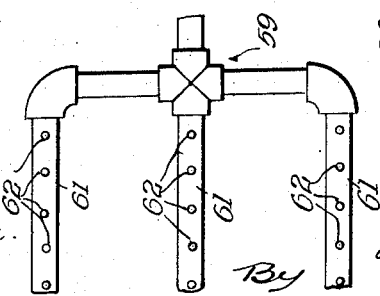

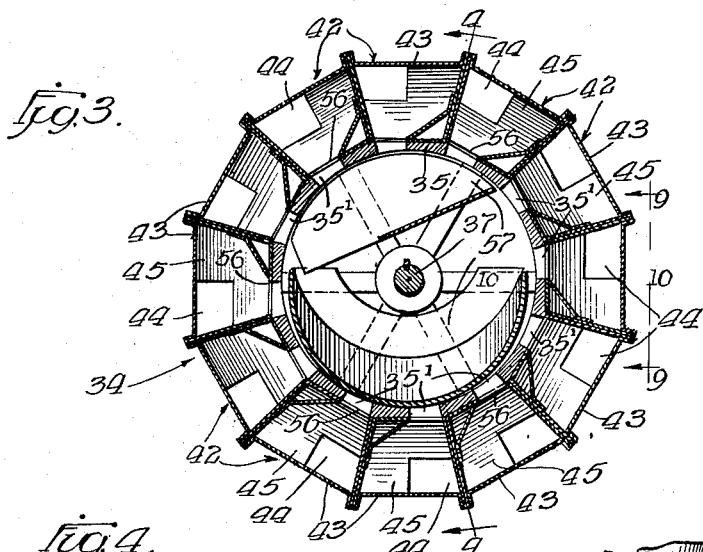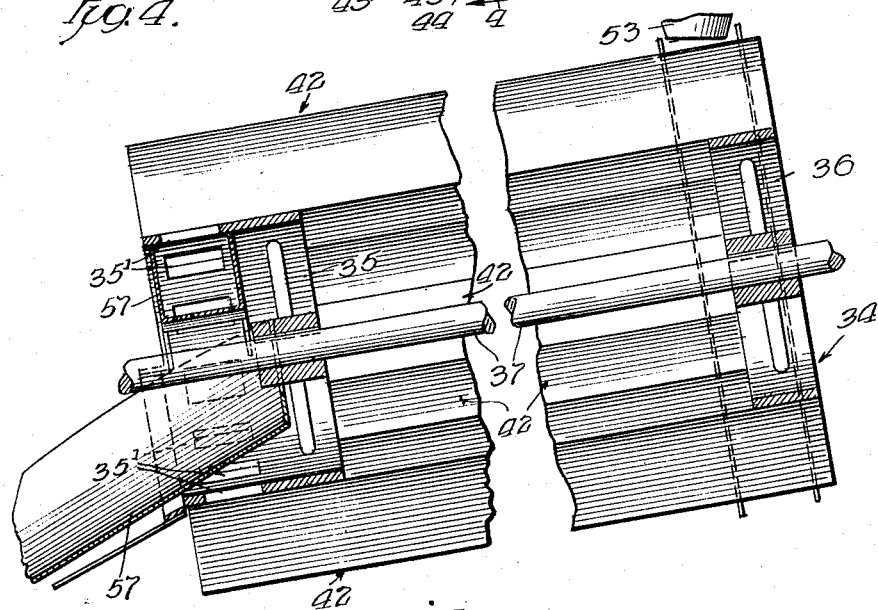

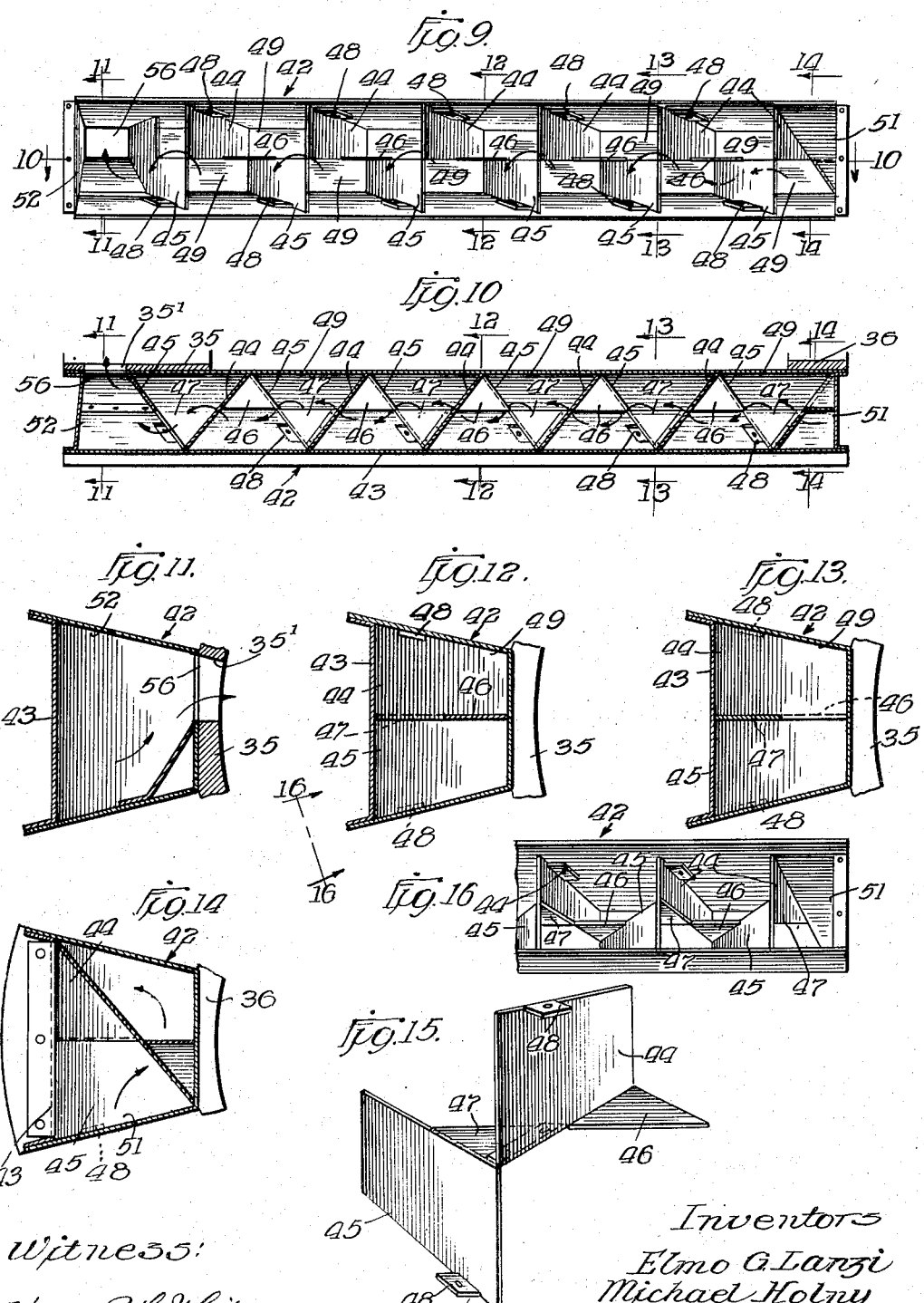

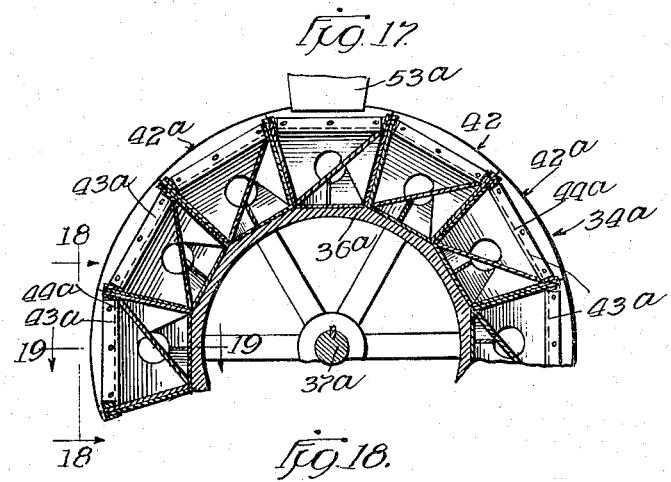

Patented Dec. 8, 1936

2,063,446

UNITED STATES PATENT OFFICE 2,063,446

ROASTING MACHINE

Elmo G. Lanzi and Michael Holny, Chicago, Ill.

Application April 12, 1934, Serial No. 720,218

2 Claims. (Cl. 34—6)

This invention relates to machines for handling and treating articles of merchandise, such, for example, as nut meats, coffee and cocoa beans, etc., and particularly to machines wherein the articles may be subjected to a partial or complete roasting process.

Machines embodying the present invention may also be employed for the mixing or thorough intermingling of different substances or articles of merchandise to obtain a substantially uniform mixture of the desired character.

For purposes of illustration, the present embodiment of the invention will be described in relation to its use in the treatment of peanuts, or similar articles, and in this connection, One object of the present invention is to provide a structure wherein articles are fed into the machine in measured quantities or groups and at speeds consistent with the efficient operation of the machine.

Another object of the invention is to provide a structure wherein the respective measured quantities or groups of articles fed to the machine are maintained separate and segregated from each other in their passage through the machine.

Another object of the invention is to provide a structure wherein articles conveyed through the machine may be heated or roasted, partially or completely, and wherein the articles being treated in suitable quantities are agitated and retarded in their passage through the machine in a manner to subject them to substantially uniform treatment by the heat employed.

Another object of the invention is to provide a machine of considerable capacity, and wherein the relative speed of the feeding and conveying means may be varied as desired.

Another object of the invention is to provide a novel conveying and agitating means employed for subjecting the articles to substantially uniform treatment.

A further object of the invention is to provide a machine of the character described which is of simple construction, economic to manufacture and efficient in its operation.

A still further object of the invention, is to improve machines of the character described in sundry details hereinafter referred to and particularly pointed out in the appended claims.

One embodiment of the present invention is shown for illustrative purposes in the accompanying drawings, in which Fig. 1 is a longitudinal sectional elevational view of a machine embodying features of the present invention, and taken substantially as indicated by the line 1—1 of Fig. 2;

Fig. 2 is an enlarged transverse sectional elevational view of a portion of the structure illustrated in Fig. 1, and taken substantially as indicated by the line 2—2 thereof;

Fig. 3 is an enlarged transverse sectional elevational view through the delivery end of the conveyer forming a part of the present invention, and taken substantially as indicated by the line 3—3 of Fig. 1;

Fig. 4 is a longitudinal sectional elevational view taken substantially as indicated by the line 4—4 of Fig. 3;

Fig. 5 is an elevational view of a portion of the feeding mechanism positioned in the hopper of the machine as illustrated in Figs. 1 and 2;

Fig. 6 is an enlarged fragmentary plan view of the portion of a burner or heating device employed in the operation of the machine, and taken substantially as indicated by the line 6—6 of Fig. 1;

Figs. 7 and 8 are enlarged fragmentary plan sectional views illustrating a portion of the frame construction, and taken substantially as indicated by the lines 7—7 and 8—8, respectively, in Fig. 1;

Fig. 9 is an elevational view of one of the receptacles forming a part of the conveyer, the view being taken substantially as indicated by the lines 9—9 in Figs. 2 and 3, and illustrating the arrangement of baffles and partitions in the interior of the receptacles.

Fig. 10 is a longitudinal plan sectional view through the structure illustrated in Fig. 9, and taken substantially as indicated by the line 10—10 thereof, and the line 10—10 of Fig. 3;

Figs. 11, 12, 13 and 14 are enlarged transverse sectional views of the structure shown in Figs. 9 and 10 and taken substantially as indicated by the lines 11—11, 12—12, 13—13 and 14—14, respectively, thereof;

Fig. 15 is an enlarged perspective view illustrating the arrangement of baffles and partitions forming one of the units adapted to be positioned in the interior of the receptacles forming a part of the conveyer as illustrated in Figs. 2, 3, 9 and 10.

Fig. 16 is a framentary elevational view slightly in perspective of a portion of the structure illustrated in Figs. 9 and 10, and taken at an angle substantially as indicated by the line 16—16 of Fig. 12;

Fig. 17 is a fragmentary transverse sectional elevational view similar to Fig. 3, and illustrating a modified form of baffles and partitions arranged in the receptacles of the conveyer for agitating and retarding the passage of articles therethrough;

Fig. 18 is an elevational view similar to Fig. 9 illustrating the arrangement of baffles and partitions shown in Fig. 17 and taken substantially as indicated by the line 18—18 thereof;

Fig. 19 is a longitudinal sectional plan view of the structure illustrated in Figs. 17 and 18, and taken substantially as indicated by the lines 19—19 thereof;

Figs. 20, 21 and 22 are enlarged transverse sectional elevational views taken substantially as indicated by the lines 20—20, 21—21 and 22—22 of Figs. 18 and 19.

The machine of the illustrative embodiment is particularly well adapted for the treatment of green or unroasted peanuts, from which the hard or woody outer shell has been removed, in which condition, it is well known that the reddish brown skins, or husks cling closely to the nut meats and are difficult to remove.

In treating peanuts, of the character above described, in the machine of the present invention, the nuts are uniformly subjected to a suitable degree of heat, sufficient to dry the skins or husks and shrink the nut meats in a manner to cause the skins to cleave or separate therefrom, thus putting the peanuts in a condition to facilitate the complete removal of the husks, or, if desired, the speed of the machine may be such, and the degree of heat employed may be sufficient to partially or completely roast the nut meats, depending upon the nature of further treatment to which the nuts may be subjected.

As previously stated, the present invention will be described in relation to its use in the handling and treatment of shelled peanuts, and referring particularly to Figs. 1 to 16, inclusive, of the drawings, it will be observed that the illustrative embodiment of the present invention includes a housing, indicated as a whole by the numeral 25, comprising end walls 26 and 27, side walls 28, top and bottom walls 29 and 31, respectively, and supporting frame members 32 adjacent the juncture of the respective walls, and to which the walls are secured, the walls of the housing being shown, in the present instance, as of hollow sheet metal construction having the space between the sheets of metal filled with a suitable insulating material such as asbestos wool, or the like, indicated at 33 for facilitating the maintenance of a desired degree of temperature within the housing.

Mounted in the housing 25 and extending longitudinally thereof is a rotatable conveyer and agitator indicated as a whole by the numeral 34, and comprising wheel-like supporting brackets 35 and 36 (Figs. 2, 3 and 4) secured to a rotatable shaft 37 mounted, preferably, on end walls 26 and 27 of the housing, and extending outwardly through the end wall 27 and provided on its outer end with a pinion 38 adapted to be driven through suitable speed reducing gearing indicated as a whole by the numeral 39, preferably, by a motor 41.

Mounted on the periphery of the wheel-like supporting brackets 35 and 36, and in annularly spaced relation with respect to each other are a plurality of elongated multi-sided trough-like receptacles, each indicated as a whole by the numeral 42, and adapted to rotate bodily around the axis of rotation of the shaft 37 and conveyer 34.

By reference to Figs. 1, 2, 3 and 10 to 14, inclusive, it will be noted that the outer side of each of the trough-like receptacles 42 are closed by a plate 43 extending substantially throughout the length of the receptacle, except that portion adjacent the upper or receiving end thereof.

By referring particularly to Figs. 9 to 16, inclusive, it will be observed that the receptacle illustrated therein, which is typical of all the receptacles, is provided in its interior with a plurality of baffles 44 and 45 arranged transversely of the receptacles in staggered relation to each other on the respective opposite longitudinal side portions of the receptacles, the respective baffles 44 and 45 being inclined in opposite directions longitudinally of the receptacle, and extending inwardly from the apexes of the angles formed by adjacent oppositely inclined baffles 44 and 45 to a point adjacent the longitudinal center line of the receptacle are a plurality of triangularly shaped semi-partitions 46 and 47, the partitions 46 extending inwardly of the receptacle from adjacent the inner or bottom side thereof, and the partitions 47 extending inwardly from adjacent the plate 43 or the other side of the receptacle, the units typical of the structure illustrated in Fig. 15 being adapted to be secured to the receptacle by means of ears 48.

It will be observed from the foregoing description, particularly of Figs. 9 to 16, inclusive, that the arrangement of the baffles 44 and 45 and the partial or semi-partitions 46 and 47 in the receptacle 42 form a sinuous passage within and extending longitudinally of the receptacles, and provide a plurality of communicating compartments 49 therein, including a receiving compartment 51 and a delivery compartment 52, the receiving compartment 51 of the respective receptacles 42 being open on its outer side and, in the rotation of the conveyer 34 as a whole, adapted to be brought into position beneath and adjacent the lower end 53 of a hopper 54 extending through an aperture 55 formed in the top wall 29 of the housing in a manner to receive articles, such, for example, as shelled peanuts, from the hopper and, by reason of the inclination of the conveyer 34 and the rotation thereof, peanuts will be conveyed through the various compartments 49 of the receptacles 42 to the delivery compartments 52, in the respective inner or bottom sides of which are formed apertures 56 adapted to coincide with apertures 35' formed in the rim of the wheel-like supporting bracket 35 through which the peanuts will pass to a discharge chute 57 adapted to extend outwardly through an aperture 58 formed in the wall 26 of the housing 25.

For providing suitable heat for the treatment of peanuts passing through the receptacles 42 of the conveyer 34, a burner indicated as a whole by the numeral 59 is positioned within the housing 25, preferably, adjacent the lower side thereof, and comprises, in the present instance, a plurality of branch pipes 61 having perforations 62 for the passage of gas which may be controlled by a hand operated valve 63 (Fig. 1) or, if desired, the admission of gas to the burner may be controlled by thermostatic means (not shown) suitably positioned within the housing for maintaining a desired temperature therein, which may be indicated by suitable means as, for example, a thermometer 64, and, if desired, a vent pipe 25a may be positioned in the housing to remove the products of combustion therefrom. For distributing the heat from the burner 59 substantially uniformly throughout the housing, deflector blades 75

65 may be positioned above the branch pipes 61, as clearly illustrated in Figs. 1 and 2.

Mounted in the hopper 54 is an inclined plate 66 adapted to direct articles such as shelled peanuts or the like, onto a transversely or oppositely inclined plate 67 terminating at its lower edge portion and adjacent the central longitudinal portion of the hopper in an arcuate trough-like portion 68, and mounted concentrically with the portion 68 is a rotatable feeder indicated as a whole by the numeral 69 and comprising a plurality of annularly spaced blades 71 forming a plurality of pockets adapted to receive the peanuts and feed them in measured quantities, groups or batches to the receiving compartments 51 of the respective receptacles 42 forming the conveyer 34, the feeder 69, in the present instance, being driven by a chain 72 operatively connected with the gearing 39 and a sprocket 73 mounted on the outer end of the feeder shaft 74 in a manner to drive the feeder 69 through two revolutions to one revolution of the shaft 37.

It will be noted in the present instance, that the conveyer 34 comprises twelve receptacles and that the feeder 69 comprises six blades 71, and it will be apparent that if the feeder 69 makes two revolutions to one revolution of the conveyer 34 as illustrated in Fig. 1, by the chain and sprocket connection between the gearing 39 and shaft 74 of the feeder, that a measured quantity or batch of peanuts will be deposited in each of the receiving compartments 51 as they are successively brought into position beneath the portion 53 of the hopper 54 as the conveyer 34 is rotated, and it will also be apparent that by reason of the multi-sided cross-sectional form of the receptacles 42 and the arrangement of the baffles 44 and 45 and the partitions 46 and 47 therein, that the various groups or batches will be segregated from each other in the respective compartments 49 of the receptacles, and will be agitated and passed therethrough in a sinuous path in a manner to prevent bunching of the various groups or batches, and presenting the articles of the various groups to substantially uniform treatment of the heat within the housing during their passage through the conveyer 34 from the hopper 54 to the discharge chute 57.

A suitable condition for treating peanuts, for example, in the manner above described may be obtained by rotating the conveyer 34 at approximately one revolution per minute, and subjecting the peanuts to a degree of heat ranging from 280° to 350° depending upon the result desired, it being understood that this speed and temperature may be varied according to the character of the articles being treated, as approximately six complete revolutions of the conveyer 34 are required to pass one batch or group of peanuts, or the like, from one end of the conveyer to the other, during which time, with the conveyer of the illustrative machine operating at full capacity, approximately seventy-two separate groups or batches of peanuts are being subjected to treatment.

Referring to Figs. 17 to 22, inclusive, the modified construction illustrated therein comprises a plurality of annularly spaced elongated multi-sided trough-like receptacles, each indicated as a whole by the numeral 42a mounted on wheel-like supporting brackets 35a and 36a secured to a rotatable shaft 37a, and adapted to rotate bodily around the center line of rotation formed by the shaft 37a in much the same manner as described in connection with Figs. 1 to 16, inclusive.

For conveying the peanuts through the receptacles 42a and maintaining the various batches or groups in segregated relation with respect to each other in their passage therethrough, a plurality of spaced transversely disposed partitions 44a are arranged in the receptacles and connected to each other by portions 46a and 47a extending inwardly from the inner and outer sides, respectively, of the receptacles in a manner to form a sinuous spiral-like passage therethrough and a plurality of spaced communicating compartments 49a therein, including a receiving compartment 51a and a delivery compartment 52a, the receiving compartment 51a of the respective receptacles 42a being open at its outer side, and adapted, in the rotation of the conveyer as a whole to be brought into position beneath and adjacent the lower end 53a of the hopper in much the same manner as described with reference to Figs. 1 to 16, inclusive, the delivery compartment 52a being provided with an aperture 56a through which the peanuts may be discharged from the receptacles through apertures 35'' formed in the wheel-like supporting bracket 35a, it being understood that the receptacles 42a are closed on their outer top side throughout a substantial portion of their length by plates 43a.

It will be observed from the foregoing description that the modified construction and arrangement illustrated in Figs. 17 to 22, inclusive, provide a structure by which the peanuts are subjected to a handling in much the same manner as described in relation to the structure illustrated in Figs. 1 to 16, inclusive.

It will be observed also that the present invention provides a novel structure and arrangement whereby the articles being handled are agitated and maintained in segregated groups or batches during their passage through the conveyer, and that the construction and arrangement shown and described provides a machine of considerable capacity, wherein the articles being handled such, for example, as peanuts or the like are uniformly subjected in relatively small quantities to a heat treatment by which the peanuts may be partly or completely roasted as desired.

Obviously, the present invention is not limited to the precise construction and arrangement shown and described, as the same may be variously modified. Moreover, all the features of the invention need not be used conjointly as the same may be used to advantage in variously different combinations and sub-combinations.

What we claim as new and desire to cover by Letters Patent is:

1. In a machine of the class described, a rotatable inclined conveyer therefor, comprising an elongated receptacle of multi-sided cross-section, a plurality of baffles within said receptacle, said baffles being arranged in staggered relation to each other on the respective opposite longitudinal side portions of the receptacle and inclined in opposite directions longitudinally thereof, and a plurality of longitudinally disposed partitions positioned between adjacent oppositely inclined baffles and extending inwardly from the apex of the angle formed thereby to a point within the receptacle intermediate oppositely disposed sides thereof, said baffles and partitions forming a sinuous passage within and extending longitudinally of the receptacle and providing a plurality of communicating compartments therein.

2. In a machine of the class described, a rotatable inclined conveyer therefor, comprising an elongated receptacle of multi-sided cross-section bodily movable around the axis of rotation of the conveyer, a plurality of baffles mounted within said receptacle, said baffles being arranged transversely of the receptacle in staggered relation to each other on the respective opposite longitudinal side portions of the receptacle and inclined in opposite directions longitudinally thereof, and a plurality of longitudinally disposed partitions positioned between and adjacent the inner edges of adjacent oppositely inclined baffles, said partitions extending inwardly from the apex of the angles formed by said adjacent oppositely inclined baffles to a point adjacent the longitudinal center line of said receptacles, said baffles and partitions forming a sinuous passage within and extending longitudinally of the receptacle and providing a plurality of staggered communicating compartments including a receiving compartment and a delivery compartment adjacent the respective opposite ends of said receptacle.

ELMO G. LANZI.
MICHAEL HOLNY.